United States Patent [19]

Ticknor

[11] Patent Number: 5,638,343
[45] Date of Patent: Jun. 10, 1997

[54] METHOD AND APPARATUS FOR RE-RECORDING MULTI-TRACK SOUND RECORDINGS FOR DUAL-CHANNEL PLAYBACK

[75] Inventor: Steven R. Ticknor, Los Angeles, Calif.

[73] Assignees: Sony Corporation, Tokyo, Japan; Sony Electronics, Inc., Park Ridge, N.J.

[21] Appl. No.: 502,750

[22] Filed: Jul. 13, 1995

[51] Int. Cl.⁶ .............................. H04B 1/20; H04R 5/00
[52] U.S. Cl. ................................ 369/4; 381/17; 381/24
[58] Field of Search .................... 369/4, 2, 3, 5; 381/17, 18, 19, 25, 24, 26, 80, 77, 182, 183

[56] References Cited

U.S. PATENT DOCUMENTS

| | | |
|---|---|---|
| 2,846,504 | 8/1958 | Mikulyak . |
| 3,088,997 | 5/1963 | Bauer . |
| 3,863,028 | 1/1975 | Fixler .................................. 179/1 |
| 3,970,787 | 7/1976 | Searle ................................. 179/1 |
| 4,088,849 | 5/1978 | Usami et al. ..................... 179/156 |
| 4,119,798 | 10/1978 | Iwahara .............................. 179/1 |
| 4,209,665 | 6/1980 | Iwahara .............................. 179/1 |
| 4,218,585 | 8/1980 | Carver ................................ 179/1 |
| 4,589,128 | 5/1986 | Pfleiderer ......................... 381/17 |
| 5,033,086 | 7/1991 | Fidi ................................... 381/25 |
| 5,181,248 | 1/1993 | Inanaga et al. ................... 381/25 |
| 5,367,506 | 11/1994 | Inanaga et al. ..................... 369/4 |
| 5,386,082 | 1/1995 | Higashi ............................ 84/630 |
| 5,438,623 | 8/1995 | Begault ............................ 381/17 |

FOREIGN PATENT DOCUMENTS

| | | |
|---|---|---|
| 2344259 | 4/1975 | Germany . |
| 61-134966 | 6/1986 | Japan ................................. 369/4 |
| 1600885 | 10/1981 | United Kingdom . |
| 2157475 | 10/1985 | United Kingdom ................ 369/4 |

OTHER PUBLICATIONS

"Aureal Semiconductor Acquires Crystal River Engineering," PR Newswire, May 8, 1996, pp. 11–12.
"3-D Audio: Above And Behind You Or Moving Low Left To Right?" Maury Wright, EDN, Jun. 6, 1996, pp. 3–10.
Mr. B.J. Spear, "International Search Report", Oct. 16, 1996, 3 pages total.

*Primary Examiner*—Tan Dinh
*Attorney, Agent, or Firm*—Blakely, Sokoloff, Taylor & Zafman

[57] ABSTRACT

A method and system are provided for re-recording multi-track sound tracks onto two-channel sound recordings. A playback mechanism that has multiple speakers is provided for reproducing the sound from the multi-track sound track. The speakers are placed around a sound sensing unit that includes two microphones. Preferably, the sound sensing unit is a binaural head microphone. The sound detected by the binaural head microphone is recorded while the playback mechanism plays the multi-track sound track through the speakers. The binaural head microphone produces two channels of sound, so the recording produced is a two-channel recording regardless of how many tracks are on the original multi-track recording. The two signals generated by the binaural head microphone contain sound direction cues. When played back through headphones, the original sound is reproduced with the sound direction cues. Consequently, it sounds to a listener as if the listener is surrounded by speakers. The two-channel sound signals produced by the binaural head microphone may be digitally recorded and played back during the execution of a computer program to provide multi-media products with enhanced sound realism.

20 Claims, 2 Drawing Sheets

METHOD AND APPARATUS FOR RE-RECORDING MULTI-TRACK SOUND RECORDINGS FOR DUAL-CHANNEL PLAYBACK

FIELD OF THE INVENTION

The present invention relates to a method and apparatus for recording sound, and more specifically, to a method and apparatus for re-recording a sound recording with three or more sound tracks for playback on a two-channel playback system.

BACKGROUND OF THE INVENTION

The quality and realism of the sound produced by the sound systems in movie theaters continues to improve. The realism is produced by recording multiple sound tracks and playing back the sound from each of the tracks in speakers that are located in different directions relative to the audience. Currently, many feature films are recorded using seven sound tracks. The seven sound tracks typically include a left surround sound track and a right surround sound track. The left surround sound track is played back through one or more speakers that are behind and to the left of the audience. The right surround sound track is played back through one or more speakers that are behind and to the right of the audience. The remaining five tracks are played back through speakers that are at various angles in front of the audience. Some films have an eighth track that is played back through a subwoofer.

The sound produced by typical home stereo systems does not approach the sound realism provided in movie theaters. Most home stereo systems reproduce stereo sound in two speakers that are typically located in front and to each side of the listener. More sophisticated home stereos are able to reproduce the surround channels. The most sophisticated home stereo systems have eight or more speakers and can reproduce all eight sound tracks. However, such home stereo systems are relatively expensive.

The sound used in computer applications has also improved. In the past, computer programs did little more than generate beeps with varying durations and frequencies. Currently, some computer programs are able to generate stereo sound with a sound quality that rivals audio CDs. Some sound adapters allow users to connect sound cards to home stereo equipment so that the sound generated by computer programs (especially computer games) may be reproduced with minimal distortion. In spite of such improvements, the sound produced by computer applications does not approach the sound realism provided in movie theaters.

SUMMARY OF THE INVENTION

In light of the foregoing, a method and system for recording and reproducing sound that approaches the realism of theater sound systems but does not require expensive sound reproduction equipment is provided. According to one aspect of the invention, multiple-channel sound tracks are re-recorded to produce a two-channel recording which, when played back through conventional headphones, provides a highly realistic sound experience.

According to one aspect of the invention, the two-channel recording is made by surrounding a binaural head microphone with speakers connected to a theater-style sound system. The theater-style sound system includes a playback unit for playing multiple sound tracks. Each of the speakers surrounding the binaural head reproduces sound from one of the sound tracks. The binaural head microphone receives the sound waves from the speakers and generates two signals. The first signal represents the sound detected in a microphone in one ear of the binaural head, and the second signal represents the sound detected in a microphone in the other ear of the binaural head. A two-channel recording unit receives the two sound signals produced by the binaural head and stores the signals in a two-channel recording.

According to an alternate embodiment of the invention, two microphones are used in place of the binaural head microphone. The microphones are separated by a distance that approximates the width of a human head. An object may be placed between the microphones to cause the sound waves to be reflected such that the sound detected by the two microphones better resembles the sound that would be detected by the ears of a human.

According to one aspect of the invention, the two-channel recording device converts sound signals to digital data. The digital data is stored on a digital data storage device. The two channels of sound may be reproduced from the digital data in synchronism with the execution of a computer program, such as a computer game.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
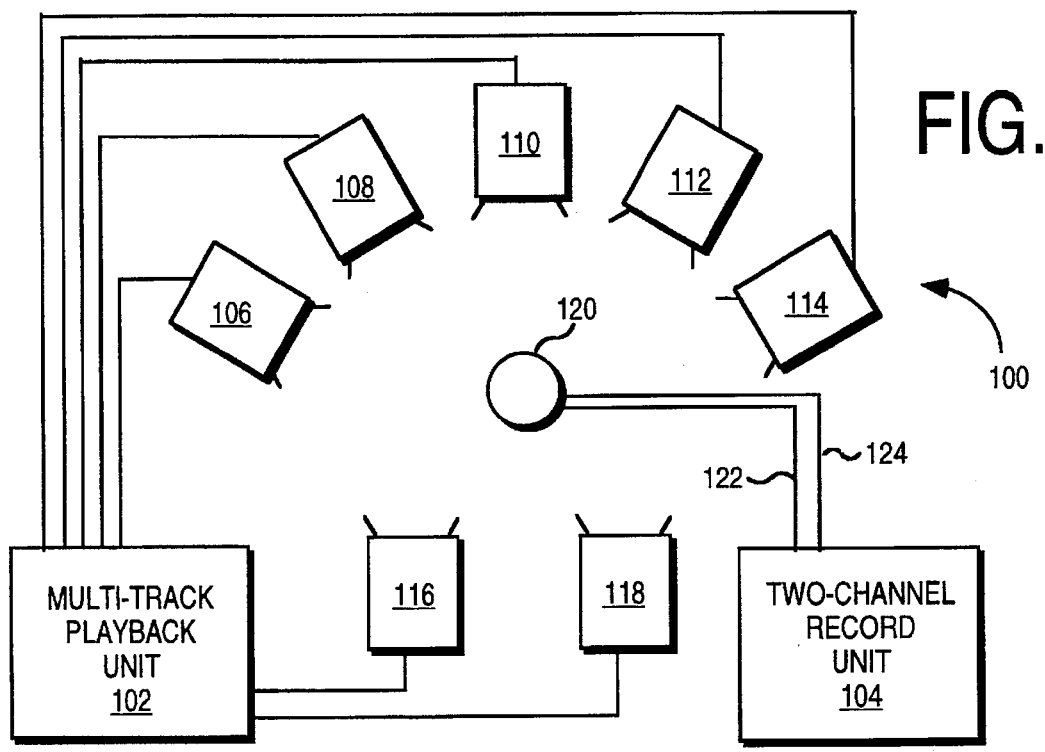
FIG. 1 is a block diagram illustrating a system for re-recording sound using a binaural head microphone according to an embodiment of the present invention.

Referring to FIG. 1, it is a block diagram illustrating a system 100 for re-recording sound according to an embodiment of the present invention. System 100 generally includes a multi-track playback unit 102, a two-channel record unit 104, a plurality of speakers 106, 108, 110, 112, 114, 116, and 118, and a binaural head microphone.

Multi-track playback unit 102 is configured to read multi-track sound recordings and to generate signals for each of the tracks in the multi-track sound recordings. In the illustrated system 100, multi-track playback unit 102 is configured to play back a seven track sound recording such as those used in feature films. The seven sound tracks include a left surround sound track, a right surround sound track, a left sound track, a left center sound track, a center sound track, a right center sound track, and a right sound track. Multi-track playback unit 102 transmits signals to the various speakers so that the sound represented on the various sound tracks are reproduced by speakers 116, 118, 106, 108, 110, 112, and 114, respectively.

Binaural head microphone 120 is an artificial human head with microphones located in each of the ears. Various factors cause the two microphones in the binaural head microphone to detect the same sound differently, just as the eardrums in actual human ears detect the same sound differently. For example, the microphones are separated by the approximate width of a human head. Consequently, one microphone will typically be closer to the source of any given sound than the other microphone. The microphone that is closer to a sound will detect the sound sooner and at a greater volume than the other microphone. The frequency response of a sound will also vary from microphone to microphone. The shape of the ears and head simulate those of a human in order to cause the sound waves to reflect and refract as if they were colliding with an actual human head. A binaural head microphone is described, for example, in U.S. Pat. No. 4,068,091 entitled Binaural Sound pickup issued on Jan. 10, 1978.

While multi-track playback unit 102 is causing speakers 106-118 to reproduce the seven channels of sound, two-channel record unit 104 is recording two channels of sound based on signals generated by binaural head microphone 120. Specifically, binaural head microphone 120 is placed in a location such that it is surrounded by speakers 106-118 as illustrated. In the preferred embodiment, speakers 106-114 are positioned approximately one foot six inches from each other, and approximately two and a half to three and a half feet from the binaural head microphone 120. Speakers 116 and 118 are positioned approximately two and a half feet apart and three to four feet away from the binaural head microphone 120. While these distances have yielded satisfactory results during testing, they are merely exemplary. The present invention is not limited to any specific speaker orientations or distances.

The microphones in binaural head microphone 120 detect the sound generated by speakers 106-118 and generate signals that represent the sound they detect. Consequently, binaural head microphone 120 produces signals for two channels of sound based on the detected sound. These sound signals are carded to two-channel record unit 104 over lines 122 and 124. Two-channel record unit 104 generally represents a device capable of recording two channels of sound. Two-channel record unit 104 records the sound signals carried on lines 122 and 124. Consequently, the recording made by two-channel record unit 104 contains the same sounds that are present in the seven-track recording in multi-track playback unit 102, except that the sound is now fixed in two tracks rather than seven.

The sound waves that binaural head microphone 120 detects from each of the various speakers will have different characteristics based on the position of the speakers relative to binaural head microphone 120. For example, the sound waves generated by speaker 106, which is to the front left of binaural head microphone 120, will be detected by the microphone in the left ear of binaural head microphone 120 before they will be detected by the microphone in the right ear of binaural head microphone 120. In contrast, the sound waves generated by speaker 114, which is to the front right of binaural head microphone 120, will be detected by the microphone in the left ear of binaural head microphone 120 after they are be detected by the microphone in the right ear of binaural head microphone 120. These timing differences, as well as volume and frequency response differences, provide cues through which the human brain determines the direction from which a sound is produced relative to the listener. Such cues are referred to hereafter as sound direction cues.

The sound signals generated by binaural head microphone 120 reflect the timing, volume and frequency response of the sound waves detected by the microphones in binaural head microphone 120. Because these characteristics are recorded in the two-channel recording made by two-channel record unit 104, the sound direction cues are reproduced when the two-channel recording is played back through headphones. The result is that the listener hears the sounds with the same sound direction cues that he would have heard if he were positioned in the location of binaural head microphone 120 during the playback of the seven-track recording. That is, the sound that was produced by speaker 116 during the two-channel recording will sound as if it were being produced from behind and to the left of the listener, the sound originally produced through speaker 118 will sound as if they were being produced in back and to the right of the listener, the sound originally produced by speaker 110 will appear as if it were being produced from a source directly in front of the listener, etc. Thus, the sound realism of an expensive seven-track playback system may be enjoyed by the owners of conventional home stereo systems.

Figure 2:
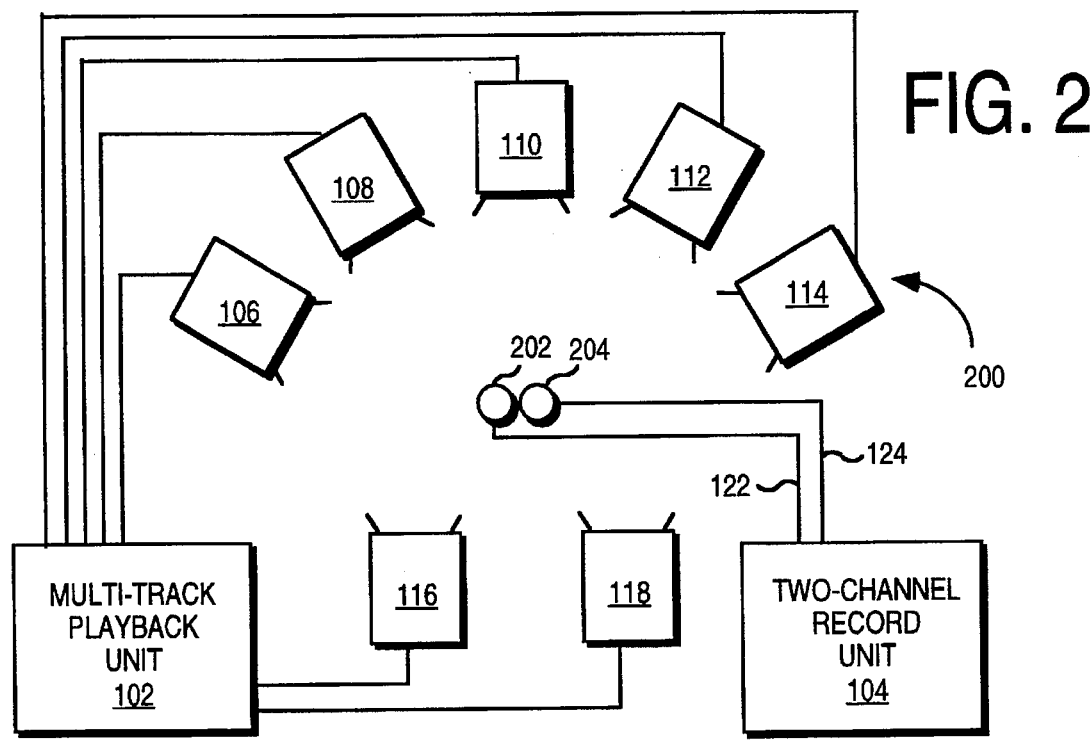
FIG. 2 is a block diagram illustrating a system for re-recording sound using two microphones according to an embodiment of the present invention.

FIG. 2 illustrates a system 200 configured according to an alternative embodiment of the invention. System 200 contains all of the components described above with respect to FIG. 1, with the exception that binaural head microphone 120 has been replaced with two single-channel microphones 202 and 204.

In this embodiment, microphone 202 generates a sound signal over line 122 that represents the sound it detects from its position relative to speakers 106-118. Microphone 204 generates a signal over line 124 that represents the sounds that it detects from its position relative to speakers 106-118. Because microphones 202 and 204 are at different locations relative to speakers 106-118, the sounds detected by the microphones will differ slightly. When the two-channel recording is played back through headphones, the slight differences will provide cues that will make the listener feel as if she is surrounded by speakers 106-118.

To increase the accuracy of the sound direction cues in the signals generated by microphones 202 and 204, microphones 202 and 204 are separated by a distance that approximates the width of a human head. In addition, an object may be placed between microphones 202 and 204 to cause the sound waves from speakers 106-118 to reflect and refract to simulate the effect caused by a human head.

As mentioned above, two-channel record unit 104 represents any device capable of recording two sound channels. According to one embodiment, two-channel record unit 104 is a device capable of storing digital representations of the sound signals on lines 122 and 124.

Figure 3:
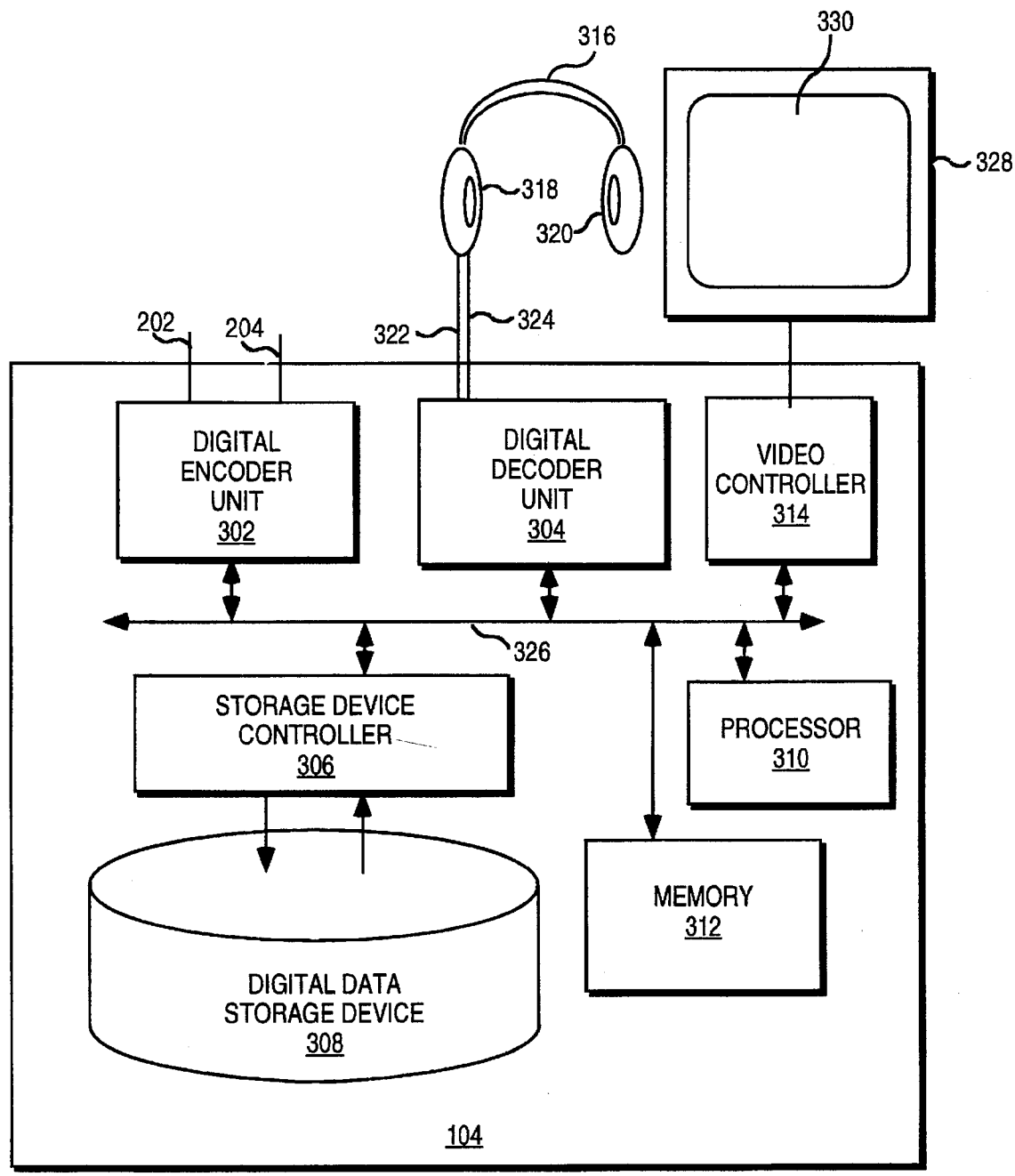
FIG. 3 is a block diagram of a two-channel record unit that is configured to convert two channels of sound to digital data according to an embodiment of the invention.

Referring to FIG. 3, it illustrates two-channel record unit 104 as a computer system configured to store a digital representation of the sound signals on lines 122 and 124, and to playback the sound signals during the execution of a computer program. In the illustrated example, two-channel record unit 104 generally includes a digital encoder unit 302, a digital decoder unit 304, a video controller 314, a bus 326, a storage device controller 306, a processor 310, memory 312, and a digital data storage device 308.

Memory 312 generally represents a relatively high-speed mechanism for storing digital information, such as random access memory. Memory 312 contains a sequence of instructions which are read over bus 326 and executed by processor 310. In response to the execution of the instructions, processor 310 sends control signals to digital encoder unit 302 which cause digital encoder unit 302 to receive the signals on lines 122 and 124 and to generate digital data that represent the sound carried on the signals.

Digital encoder unit 302 generates the digital sound data and transmits the data over bus 326 to storage device controller 306. Storage device controller 306 writes the digital sound data to digital data storage device 308. Digital encoder unit 302 may use any of the numerous techniques for digitizing sound signals. The present invention is not limited to any particular sound digitizing technique or format.

Digital data storage device 308 generally represents a device capable of storing digital information. Digital data storage device 308 may be, for example, a CD-ROM, a hard drive or a floppy drive. Storage device controller 306, in turn, generally represents a controller capable of reading from and writing to digital data storage device 308.

Once the sound signals on lines 122 and 124 have been digitally stored on digital data storage device 308, processor 310 may cause the sound signals to be reproduced based on the digital sound data during the execution of a computer program. Specifically, processor 310 may send control signals to digital decoder unit 304 over bus 326 to instruct digital decoder unit 304 to generate sound signals over lines 322 and 324 based on the digital sound data. In response to the control signals from processor 310, digital decoder unit 304 generates control signals over bus 326 to storage device controller 306 to cause storage device controller to read the digital sound data from digital data storage device 308.

Storage device controller 306 reads the digital sound data and transmits the digital sound data to digital decoder unit 304 over bus 326. Digital decoder unit 304 decodes the digital sound data and generates two channels of sound signals over lines 322 and 324 based on the digital sound data. The specific technique by which digital decoder unit 304 decodes the digital sound data will vary from implementation to implementation based on the format in which the digital sound data was encoded and stored on digital data storage device 308.

A user may listen to the sound represented in the signals on lines 322 and 324 through headphones 316. Headphones 316 include two speakers 318 and 320 which, when headphones 316 are worn by a user, are adjacent to the ears of the user.

The sound direction cues that reflect the positions of speakers 106–118 relative to binaural head microphone 120 are maintained during the digital encoding and decoding process. Consequently, the sounds heard by the wearer of headphones 316 will sound to the user as if the user were surrounded by speakers 106–118.

During the playback of the two-channel sound recording, processor 310 may be simultaneously executing instructions stored in memory 312. Execution of the instructions may cause processor 310 to send control signals to video controller 314 to cause a visual image to be generated on a screen 330 of a display device 328. The visual displays generated on screen 330 may be synchronized with the playback of the two-channel recording for multimedia applications. The present invention is particularly suited to entertainment applications, such as games, where the realism of the sound heard by the wearer of headphones 316 greatly enhances the game playing experience.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. A method for re-recording sound that has been recorded on a sound recording that has at least three channels, the method comprising the steps of:

placing a two-channel sound sensing unit in a first location;

placing at least three speakers at different locations relative to the first location;

playing the sound recording through said at least three speakers so that the sound on each channel of said at least three channels is reproduced by a corresponding speaker of said at least three speakers; and recording the sound detected by the two-channel sound sensing unit while the sound on said at least three channels is being reproduced by said at least three speakers.

2. The method of claim 1 wherein the step of recording the sound detected by the two-channel sound sensing unit comprises recording the sound detected by a binaural head microphone.

3. The method of claim 1 wherein the step of recording the sound detected by the two-channel sound sensing unit comprises recording the sound detected by two mono-aural microphones.

4. The method of claim 1 wherein the two-channel sound sensing unit produces two channels of sound signals, the step of recording the sound detected by the two-channel sound sensing unit includes the steps of:

digitizing the two channels of sound signals to produce digital data that represents the two channels of sound; and storing on a digital storage medium the digital data that represents the two channels of sound.

5. The method of claim 4 further comprising the steps of:

causing a computer system to read the digital data while the computer system is executing a program; and causing the computer system to reproduce the two channels of sound based on the digital data while the computer system is executing the program.

6. The method of claim 5 further comprising the step of playing through headphones the two channels of sound that are reproduced based on the digital data.

7. The method of claim 1 wherein said at least three channels include at least five channels, two of said at least five channels being surround channels, said step of placing said at least three speakers comprising the steps of:

placing at least three speakers on a first side of said two-channel sound sensing unit; and placing at least two speakers on a second side of said two-channel sound sensing unit;

wherein said step of playing the sound through said at least three speakers includes the steps of:

playing at least three channels through the at least three speakers on said first side of said two-channel sound sensing unit, said at least three channels not being said two surround channels; and playing said two surround channels through the at least two speakers on said second side of the two-channel sound sensing unit.

8. The method of claim 7 wherein said at least five channels include at least seven channels, wherein said at least two speakers include a first surround speaker and a second surround speaker, said step of placing at least three speakers on one side of said two-channel sound sensing unit comprising the steps of:

placing a center speaker to approximately face said two-channel sound sensing unit, said center speaker being placed such that a line between said center speaker and said first surround speaker fails on the opposite side of said two-channel sound sensing unit as a line between said center speaker and said second surround speaker;

placing two speakers to approximately face said two-channel sound sensing unit on a first side of said center speaker; and placing two speakers to approximately face said two-channel sound sensing unit on a second side of said center speaker.

9. The method of claim 7 wherein:

said step of placing said at least three speakers on said first side of said two-channel sound sensing unit comprises placing said at least three speakers so that they approximately face the two-channel sound sensing unit and are located at approximately an equal distance from the two-channel sound sensing unit; and said step of placing said at least two speakers on said second side of said two-channel sound sensing unit comprises placing said at least two speakers so that they approximately face the two-channel sound sensing unit and are located at approximately an equal distance from the two-channel sound sensing unit.

10. A sound re-recording system comprising:

a two-channel sound sensing unit located at a first position;

at least three speakers located at different positions relative to said first position;

a playback unit coupled to said at least three speakers, said playback unit causing each speaker of said at least three speakers to reproduce sound from a different channel of a multi-track recording;

a two-channel record unit coupled to said playback unit; and wherein said two-channel record unit records sound detected by said two-channel sound sensing unit while said at least three speakers are reproducing sound from said multi-track recording.

11. The sound re-recording system of claim 10 wherein said two-channel record unit comprises a binaural head microphone.

12. The sound re-recording system of claim 10 wherein said two-channel record unit comprises two mono-aural microphones.

13. The sound re-recording system of claim 10 wherein said multi-track recording has at least seven tracks and said at least three speakers includes at least seven speakers.

14. The sound re-recording system of claim 13 wherein at least three of said at least seven speakers are located on a first side of said two-channel sound sensing unit and at least two speakers are located on a second side of said two-channel sound sensing unit.

15. The sound re-recording system of claim 14 wherein said at least seven tracks include a first surround track and a second surround track, said at least two speakers including a first speaker that reproduces the sound from said first surround track and a second speaker that reproduces the sound from said second surround track.

16. The sound re-recording system of claim 10 wherein said two channel-record unit includes an encoding unit for generating digital data based on said sound detected by said two-channel sound sensing unit.

17. The sound re-recording system of claim 16 further comprising a decoding unit for generating sound based on said digital data.

18. The sound re-recording system of claim 17 wherein said decoding unit is implemented in a computer system.

19. The sound re-recording system of claim 18 wherein said computer system causes said decoding unit to generate sound based on said digital data during execution of a computer program.

20. The sound re-recording system of claim 16 further comprising a mechanism for storing said digital data on a CD-ROM.

* * * * *

UNITED STATES PATENT AND TRADEMARK OFFICE
CERTIFICATE OF CORRECTION

PATENT NO. : 5,638,343
DATED : June 10, 1997
INVENTOR(S) : Ticknor

It is certified that error appears in the above-identified patent and that said Letters Patent is hereby corrected as shown below:

Title page, item [73], Assignee: delete "Sony Electronics, Inc., Park Ridge, N.J." and insert --Sony Pictures Entertainment, Culver City, CA --.

Signed and Sealed this

Fourteenth Day of December, 1999

Attest:

Q. TODD DICKINSON

*Attesting Officer*        *Acting Commissioner of Patents and Trademarks*